C. REUTZEL & H. FREY.
PLANTER.
APPLICATION FILED OCT. 7, 1909.
951,026.
Patented Mar. 1, 1910.
2 SHEETS—SHEET 1.
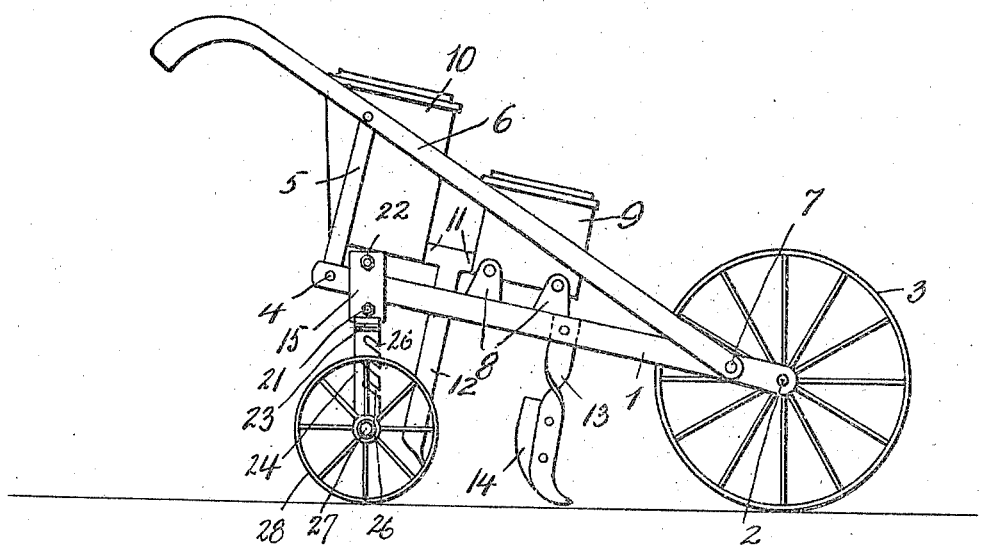
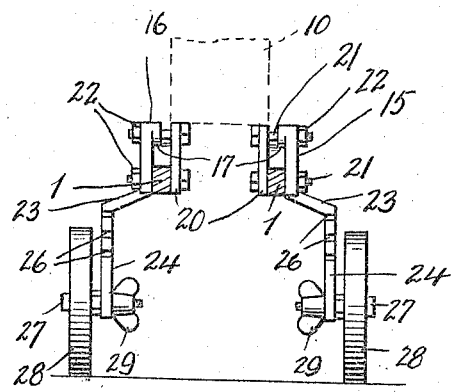
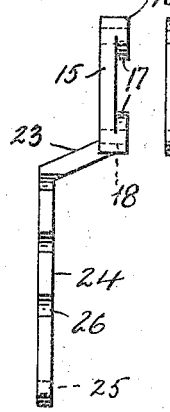
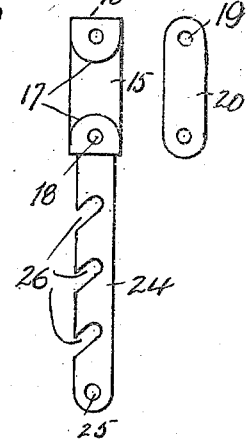
Witnesses:—
Samuel Payne
R. O. C. Butler
Inventors
C. Reutzel & H. Frey
by H. C. Evert Co.
Attorneys.

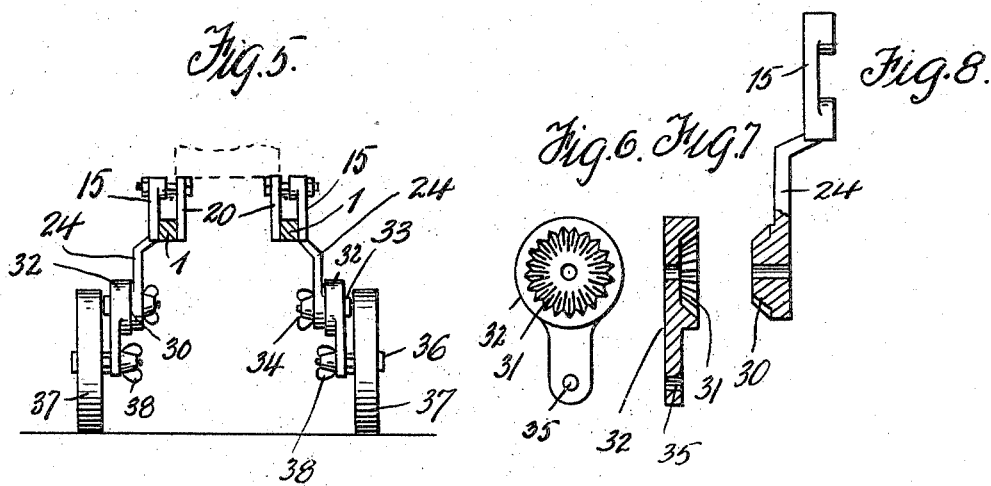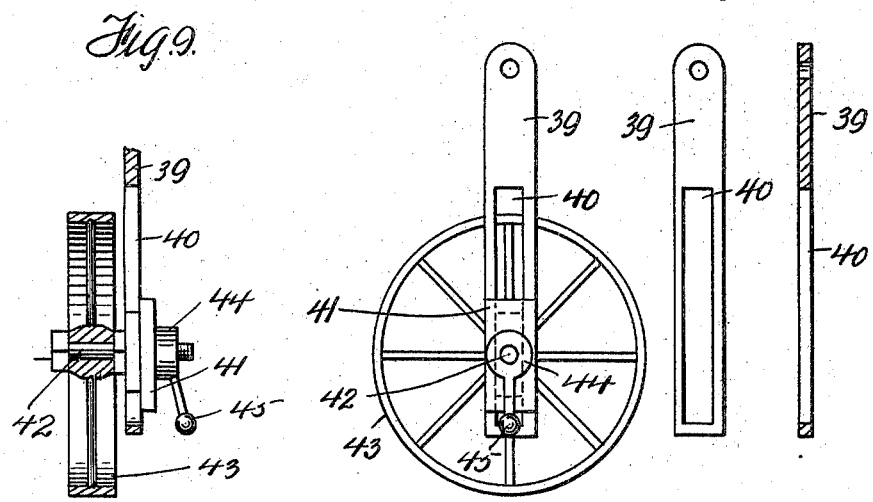

ial view of the implement illustrating a modification of our improvement, Fig. 6 is a side elevation of a modified form of bearing, Fig. 7 is a cross sectional view of the same, Fig. 8 is a side elevation of a modified form of hanger, partly broken away and partly in section, Fig. 9 is a front elevation of still another modified form of construction, partly broken away and partly in section, Fig. 10 is a side elevation of the same, Fig. 11 is a similar view of the hanger, Fig. 12 is a vertical sectional view of the hanger, Fig. 13 is a side elevation of a bearing forming part of the modification, and Fig. 14 is a vertical sectional view of the same.

UNITED STATES PATENT OFFICE.

CONRAD REUTZEL AND HENRY FREY, OF PITTSBURG, PENNSYLVANIA.

PLANTER.

951,026.

Specification of Letters Patent.

Patented Mar. 1, 1910.

Application filed October 7, 1909. Serial No. 521,602.

*To all whom it may concern:*

Be it known that we, CONRAD REUTZEL and HENRY FREY, citizens of the United States of America, residing at N. S. Pittsburg, in the county of Allegheny and State of Pennsylvania, have invented certain new and useful Improvements in Planters, of which the following is a specification, reference being had therein to the accompanying drawing.

This invention relates to a planter, and more particularly to that type of planter shown and described in our Patent No. 927,284, granted July 6th, 1909. In this patent we illustrated a planter having rear supporting wheels adjustably mounted relative to the frame of the implement, the adjustment being controlled from the handle bars thereof, and we have found by actual experience that the same, if not better, results can be obtained by a simplified adjustment device that is carried by the framework of the implement independent of the handle bars.

The present invention therefore aims to provide adjustable means for supporting the rear wheels of a planter from the framework of the implement independent of the remainder of the structure, the adjustable means being simple, durable and comparatively inexpensive to manufacture. To this end, we provide the frames of a planting implement with depending bearings to which revoluble wheels are adjustably connected to support the rear end of the implement. Various ways of accomplishing this result will be hereinafter described and then claimed, and reference will now be had to the drawings forming a part of this specification, wherein there is illustrated the preferred embodiments of the invention, but it is to be understood that the structural elements thereof are susceptible to changes, variations and modifications without departing from the spirit and scope of the invention.

In the drawing:—Figure 1 is a side elevation of an implement constructed in accordance with our invention, Fig. 2 is a cross sectional view of the same, partly broken away and partly in section, Fig. 3 is a front elevation of one of the bearings or hangers forming part of our improvement, Fig. 4 is a side elevation of the same, Fig. 5 is a cross sectional view of the implement illustrating a modification of our improvement, Fig. 6 is a side elevation of a modified form of bearing, Fig. 7 is a cross sectional view of the same, Fig. 8 is a side elevation of a modified form of hanger, partly broken away and partly in section, Fig. 9 is a front elevation of still another modified form of construction, partly broken away and partly in section, Fig. 10 is a side elevation of the same, Fig. 11 is a similar view of the hanger, Fig. 12 is a vertical sectional view of the hanger, Fig. 13 is a side elevation of a bearing forming part of the modification, and Fig. 14 is a vertical sectional view of the same.

A conventional form of implement is shown in Fig. 1, wherein the reference numeral 1 denotes converging longitudinal frames having the forward end thereof provided with an axle 2 upon which is revolubly mounted a large wheel 3 adapted to support the forward end of the implement. The rear ends of the frames 1 are connected together by a transverse rod 4 and this rod is provided with braces 5 for handle bars 6, which are connected adjacent to the forward end of the converging frames 1, as at 7. The converging frames 1 are provided with suitable supports 8 for seed receptacles 9 and 10, and these receptacles are connected by the branches 11 of a depending sowing spout 12 adapted to deliver the contents of the receptacles 9 and 10 to the furrow which is produced by a movement of the implement. To produce a furrow, the longitudinal frames 1 are provided with a depending support or standard 13 for the blade or shear 14 adapted to engage in the soil and throw the soil to one side in order to form a furrow for the reception of seed from the depending distributing spout 12.

To regulate the depth of the furrow provided for the seed, also the depth at which the seed is sown, we have devised an adjustment device for the rear end of the implement.

The adjustment comprises two hangers 15 having the upper and lower ends thereof provided with oppositely disposed enlargements 16, with the confronting edges of said enlargements rounded, as at 17. The enlargements 16 and the ends of the hangers are provided with transverse openings 18 and adapted to longitudinally aline with these openings 18 are the openings 19 of straps 20. The enlargements 16 are adapted to engage the upper and lower edges of the frames 1, while the hangers 15 and the straps 20 engage the sides of said frames, said straps being connected to the hangers 15 by bolts 21 and nuts 22.

The hangers 15 are provided with outwardly projecting angularly disposed arms 23 terminating in depending vertical bearings 24, said bearings having the lower ends thereof provided with openings 25, while the forward edges of said bearings are provided with angularly disposed slots 26. Mounted in the openings 25 are the stub axles 27 of revoluble wheels 28, the stub axles being held in engagement with the bearings 24 by winged thumb nuts 29. The stub axles 27 can be easily removed from the openings 25 and placed in the slots 26, according to the height at which the rear ends of the converging frames 1 are to be supported above the soil or ground over which the implement is adapted to pass.

The rounded edges 17 of the enlargements 16 of the hangers 15 permit of said hangers always being positioned at right angles to the ground over which the implement passes, consequently the bearings 24 can be maintained in proper position to normally hold the revoluble wheels 28, whereby said wheels will coöperate with the front wheel 3 in moving the implement over the soil.

A modification of the invention is shown in Figs. 5 to 8 inclusive, wherein the bearing 24 has the outer side thereof at its lower end provided with a circumferentially toothed enlargement 30 adapted to fit in a toothed socket 31 provided therefor in a bearing 32 adapted to be attached to the enlargement 31 by a bolt 33 and a winged thumb nut 34. The bearing 32 is provided with an opening 35 for the stub shaft 36 of a revoluble wheel 37, said stub shaft being retained in engagement with the bearing 32 by a winged thumb nut 38. It is through the medium of the toothed enlargement 30 engaging with the toothed socket 31 of the bearing 32 that we are enabled to securely fix the bearing 32 at any desired angle relative to the bearing 32, whereby the converging frames 1 will be supported at a desired height above the soil.

In Figs. 9 to 14 inclusive a further modification of our invention is shown, wherein hangers 39 are directly connected to the frames 1 and the hangers provided with vertical slots 40. Slidably mounted in the slots 40 are bearing blocks 41 and extending through said bearing blocks are the stub shafts 42 of revoluble wheels 43, said stub shafts being fixed in the blocks 41 and the blocks fixed relative to the hangers 39 by nuts 44 provided with cranks 45. By tightening the nuts 44, the bearing blocks 41 can be locked in engagement with the hangers 39 and the stub shafts 42 retained in engagement with said blocks, whereby the wheels 43 can freely revolve upon the stub shafts.

In the modifications of our invention, we have simply illustrated mechanical equivalents of the device illustrated in Figs. 1 to 4 inclusive, and it is in this connection, that we reserve the right to use various adjusting mechanisms in connection with the converging frames 1 for revolubly supporting wheels adapted to coöperate with the wheel 3 in movably supporting the planter.

Having now described our invention what we claim as new, is:—

1. In a planter, the combination with frames adapted to support seed receptacles, and a wheel supporting the forward end of said frames, of hangers detachably connected to said frames, depending bearings carried by said hangers, a revoluble wheel adjustably connected to said bearings.

2. In a planter, the combination with frames adapted to support seed receptacles, and a revoluble wheel adapted to support the forward end of said frames, of hangers detachably connected to the rear ends of said frames, bearings carried by said hangers, revoluble wheels adapted to support said bearings, and means for detachably and adjustably connecting said wheels to said bearings.

In testimony whereof we affix our signatures in the presence of two witnesses.

CONRAD REUTZEL.
HENRY FREY.

Witnesses:
KARL H. BUTLER,
JOHN STEPHANY.